United States Patent
Bluvshteyn et al.

(10) Patent No.: US 7,529,775 B2
(45) Date of Patent: May 5, 2009

(54) METHOD AND SYSTEM FOR COLLECTING INFORMATION ABOUT APPLICATIONS ON A COMPUTER SYSTEM

(75) Inventors: Vadim Bluvshteyn, Woodinville, WA (US); Michael Sciacqua, North Bend, WA (US); Donald J. Munsil, Kirkland, WA (US); Corneliu Lupu, Sammamish, WA (US); Maoni Stephens, Sammamish, WA (US); Mark S. Carroll, Woodinville, WA (US); Steven S. Heinz, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 10/644,264

(22) Filed: Aug. 20, 2003

(65) Prior Publication Data

US 2005/0044057 A1   Feb. 24, 2005

(51) Int. Cl.
*G06F 17/30* (2006.01)
(52) U.S. Cl. .................... 707/202; 707/101; 717/174
(58) Field of Classification Search ............ 707/1, 707/3, 10, 100, 102, 203, 103, 101, 104.1, 707/200, 202, 204; 717/168–172, 174, 177
See application file for complete search history.

(56) References Cited

U.S. PATENT DOCUMENTS

| | | | | |
|---|---|---|---|---|
| 4,558,413 A | * | 12/1985 | Schmidt et al. | 707/203 |
| 5,473,772 A | * | 12/1995 | Halliwell et al. | 717/171 |
| 5,528,490 A | * | 6/1996 | Hill | 717/168 |
| 5,586,304 A | * | 12/1996 | Stupek et al. | 717/170 |
| 5,586,322 A | * | 12/1996 | Beck et al. | 707/200 |
| 5,752,042 A | * | 5/1998 | Cole et al. | 717/173 |
| 5,845,077 A | * | 12/1998 | Fawcett | 709/221 |
| 6,078,912 A | * | 6/2000 | Buerger et al. | 707/1 |
| 6,151,708 A | * | 11/2000 | Pedrizetti et al. | 717/173 |
| 6,282,709 B1 | * | 8/2001 | Reha et al. | 717/175 |
| 6,324,544 B1 | * | 11/2001 | Alam et al. | 707/201 |
| 6,324,693 B1 | * | 11/2001 | Brodersen et al. | 717/177 |
| 6,424,966 B1 | | 7/2002 | Meyerzon et al. | 707/3 |
| 6,519,767 B1 | | 2/2003 | Carter et al. | 717/140 |
| 6,751,794 B1 | * | 6/2004 | McCaleb et al. | 717/168 |
| 6,895,513 B1 | * | 5/2005 | Balasubramaniam et al. | 726/24 |

(Continued)

OTHER PUBLICATIONS

Bauer et al., "Strategies for Distributed Search", *Proceedings of CSC 92: ACM 20th Annual Computer Science Conference*, Kansas City, MO, pp. 251-260 (Mar. 1992).

*Primary Examiner*—Cheryl Lewis
(74) *Attorney, Agent, or Firm*—Wolf, Greenfield & Sacks, P.C.

(57) ABSTRACT

A standard reporting schema to represent applications and other information on a computer in a hierarchical manner, such as via an XML (extensible markup language) file. An agent or engine is provided to inventory a computer for installed applications or services and to output a report, or log file, conforming to the schema standard. A calculation may be performed on a subset of attributes stored in the log file for an application or a service so as generate a signature representing the subset. The signature may be stored with the log file, and may be accessed quickly in a database to determine whether or not the application is a particular application, or, if more particular resources are defined, to determine more specific information, such as whether the application is a particular version or run of the application.

22 Claims, 10 Drawing Sheets

U.S. PATENT DOCUMENTS

| | | | | |
|---|---|---|---|---|
| 6,950,863 B1 * | 9/2005 | Pham et al. | ................. | 709/221 |
| 6,976,251 B2 * | 12/2005 | Meyerson | ................. | 717/173 |
| 6,986,063 B2 * | 1/2006 | Colvin | ................. | 705/51 |
| 7,127,641 B1 * | 10/2006 | Anderson | ................. | 714/38 |
| 7,143,288 B2 * | 11/2006 | Pham et al. | ................. | 713/165 |
| 2001/0056425 A1 * | 12/2001 | Richard | ................. | 707/10 |
| 2002/0059280 A1 * | 5/2002 | Slesinsky | ................. | 707/100 |
| 2002/0065950 A1 * | 5/2002 | Katz et al. | ................. | 709/318 |
| 2002/0083053 A1 * | 6/2002 | Richard et al. | ................. | 707/3 |
| 2003/0041094 A1 * | 2/2003 | Lara et al. | ................. | 709/201 |
| 2003/0090531 A1 | 5/2003 | Wong | | |
| 2003/0167354 A1 * | 9/2003 | Peppers et al. | ................. | 709/327 |
| 2003/0200207 A1 * | 10/2003 | Dickinson | ................. | 707/3 |
| 2004/0031030 A1 * | 2/2004 | Kidder et al. | ................. | 717/172 |
| 2004/0064568 A1 * | 4/2004 | Arora et al. | ................. | 709/228 |
| 2004/0068483 A1 * | 4/2004 | Sakurai et al. | ................. | 707/1 |
| 2004/0103190 A1 * | 5/2004 | Mochizuki et al. | ................. | 709/224 |
| 2005/0033777 A1 * | 2/2005 | Moraes et al. | ................. | 707/202 |

* cited by examiner

METHOD AND SYSTEM FOR COLLECTING INFORMATION ABOUT APPLICATIONS ON A COMPUTER SYSTEM

TECHNICAL FIELD OF THE INVENTION

The present invention generally relates to computers, and more specifically to collecting information about applications on a computer.

BACKGROUND OF THE INVENTION

The identification of software applications on a computer is often desirable to communicate the status of the applications on the computer. For example, in a network environment, an administrator may desire to know the identification of software applications on a particular machine, or on multiple machines within the network. The information wanted by the administrator may include, as examples, application compatibility, vendor information, version information, or the like. Assembling such information by hand is often not a viable option, because the volume of the information may be prohibitive, and some information, such as version information, may constantly change due to updates or other changes on individual computers within the network. Moreover, if the information is gathered by an individual and entered into a database, the information may be prone to errors, and a search of the information may not result in all matches for the particular item for which the search is being conducted.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with one embodiment, the present invention provides a standard reporting schema to represent applications and other information on a computer in a hierarchical manner, such as via an XML (extensible markup language) file. The schema may include, for example, such items as system information, information about services and/or applications on the computer, and/or application compatibility information.

In accordance with another embodiment, an agent or engine is provided to inventory a computer for installed applications or services and to output a report, or log file, conforming to the schema standard. The agent is a relatively lightweight executable which may be run on many or all of the computers in the network so as to provide a log file for each of the computers. The log file for each of the computers may be maintained in a central location. The database of log files may be searched or otherwise accessed by an administrator or another user desiring status (e.g., compatibility, vendor information, or the like) of applications or services on the network.

In accordance with another embodiment, a calculation may be performed on a subset of attributes stored in the log file for an application or a service so as generate a signature representing the subset. The signature may be stored with the log file, and may be accessed quickly in a database to determine whether or not the application is a particular application, or, if more particular resources are defined, to determine more specific information, such as whether the application is a particular version or run of the application.

Other features of the invention will become apparent from the following detailed description when taken in conjunction with the drawings, in which:

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Prior to proceeding with a description of the various embodiments of the invention, a description of a computer and a networking environment in which the various embodiments of the invention may be practiced will now be provided. Although it is not required, the present invention may be implemented by programs that are executed by a computer. Generally, such programs include routines, objects, components, data structures and the like that perform particular tasks or implement particular abstract data types. The term "program" as used herein may connote a single program module or multiple program modules acting in concert. The terms "computer" and "computer system" as used herein includes any device that electronically executes one or more programs, such as personal computers (PCs), hand-held devices, multiprocessor systems, microprocessor-based programmable consumer electronics, network PCs, minicomputers, mainframe computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

An example of a networked environment in which the invention may be used will now be described with reference to FIG. 1. The example network of FIG. 1 includes several computers 10 communicating with one another over a network 11, represented by a cloud. The network 11 may include many well-known components, such as routers, gateways, hubs, etc. and allows the computers 10 to communicate via wired and/or wireless media. When interacting with one another over the network 11, one or more of the computers 10 may act as clients, servers or peers with respect to other computers 10. Accordingly, the various embodiments of the invention may be practiced on clients, servers, peers or combinations thereof, even though specific examples contained herein do not refer to all of these types of computers.

Figure 1:
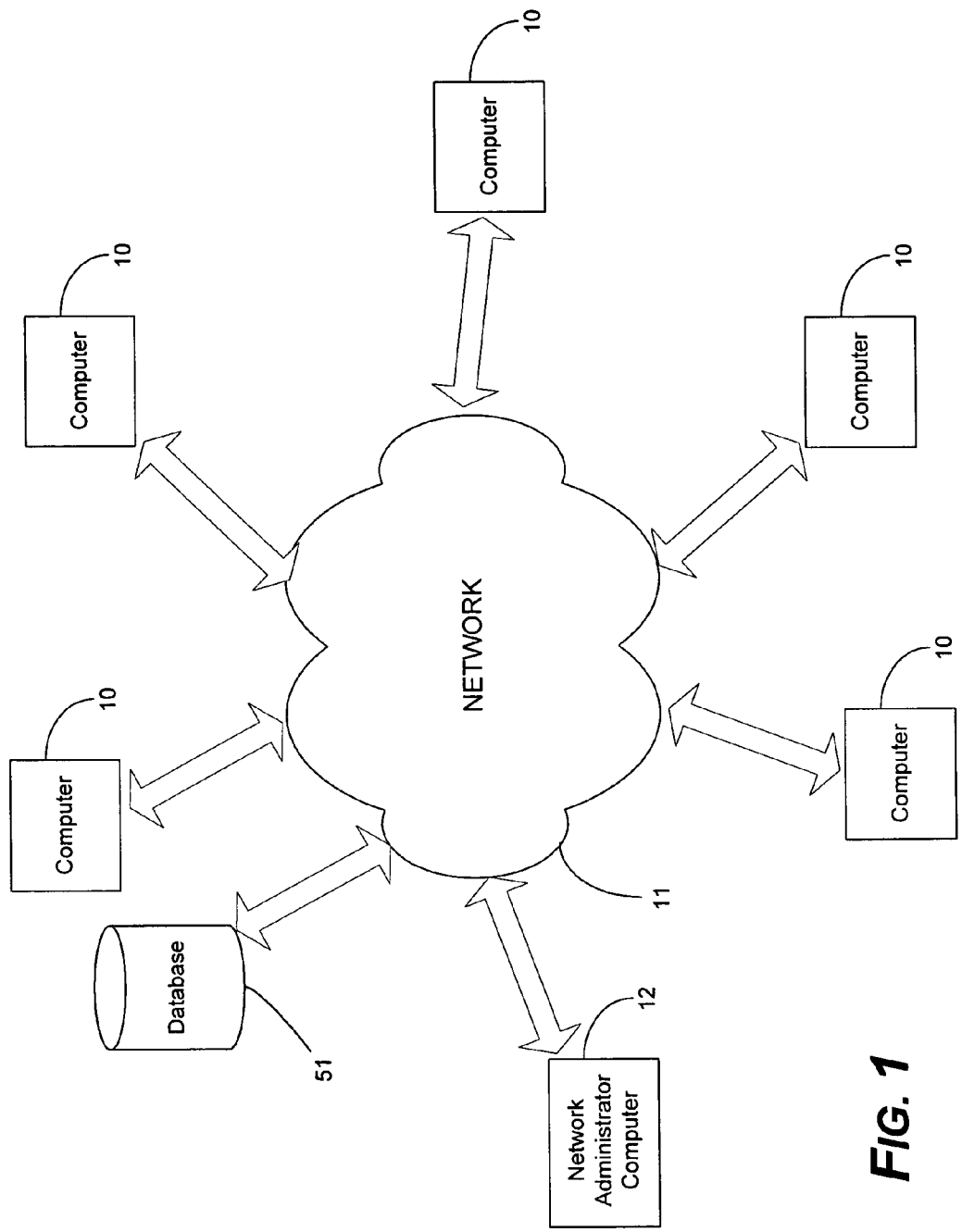
FIG. 1 is a block diagram showing several computers communicating with one another over a network usable to implement an embodiment of the invention.

In the network 11 shown in FIG. 1, one of the computers 10 serves as a network administrator for the network 11, and is designated generally by the reference numeral 12. The network administrator computer 12 is a computer through which an administrator of the network 11 may access the computers 10 on the network 11, and may be, for example, a server or a client in the network 11.

Figure 2:
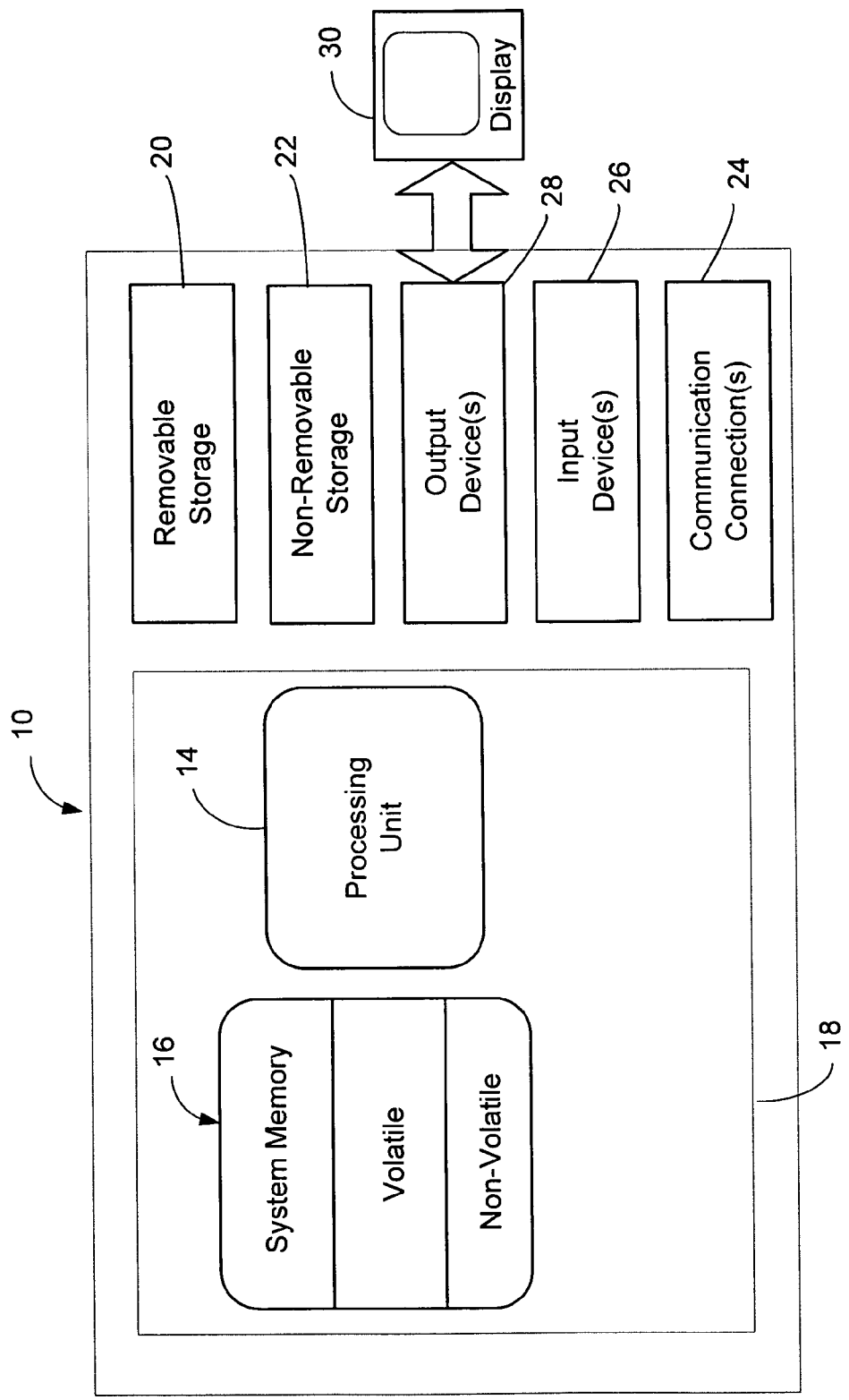
FIG. 2 is a block diagram displaying an example of a basic configuration for a computer on which all or parts of the invention described herein may be implemented.

Referring to FIG. 2, an example of a basic configuration for a computer 10 on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18.

The computer 10 may have additional features and/or functionality. For example, the computer 10 may also include additional storage (removable storage 20 and/or non-removable storage 22) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

The computer 10 preferably also contains communications connection(s) 24 that allow the device to communicate with other devices. A communication connection (e.g., one of the communication connections 24) is an example of a communication medium. Communication media typically embody computer readable instructions, data structures, program modules or other data in a modulated data signal such as a carrier wave or other transport mechanism and include any information delivery media. By way of example, and not limitation, the term "communication media" includes wired media such as a wired network or direct-wired connection, and wireless media such as acoustic, RF, infrared and other wireless media. The term "computer-readable medium" as used herein includes both computer storage media and communication media.

The computer 10 may also have input devices 26 such as a keyboard, mouse, pen, voice input device, touch input device, etc. Output devices 28 such as a display 30, speakers, a printer, etc. may also be included. All these devices are well known in the art and need not be discussed at length here.

Figure 3:
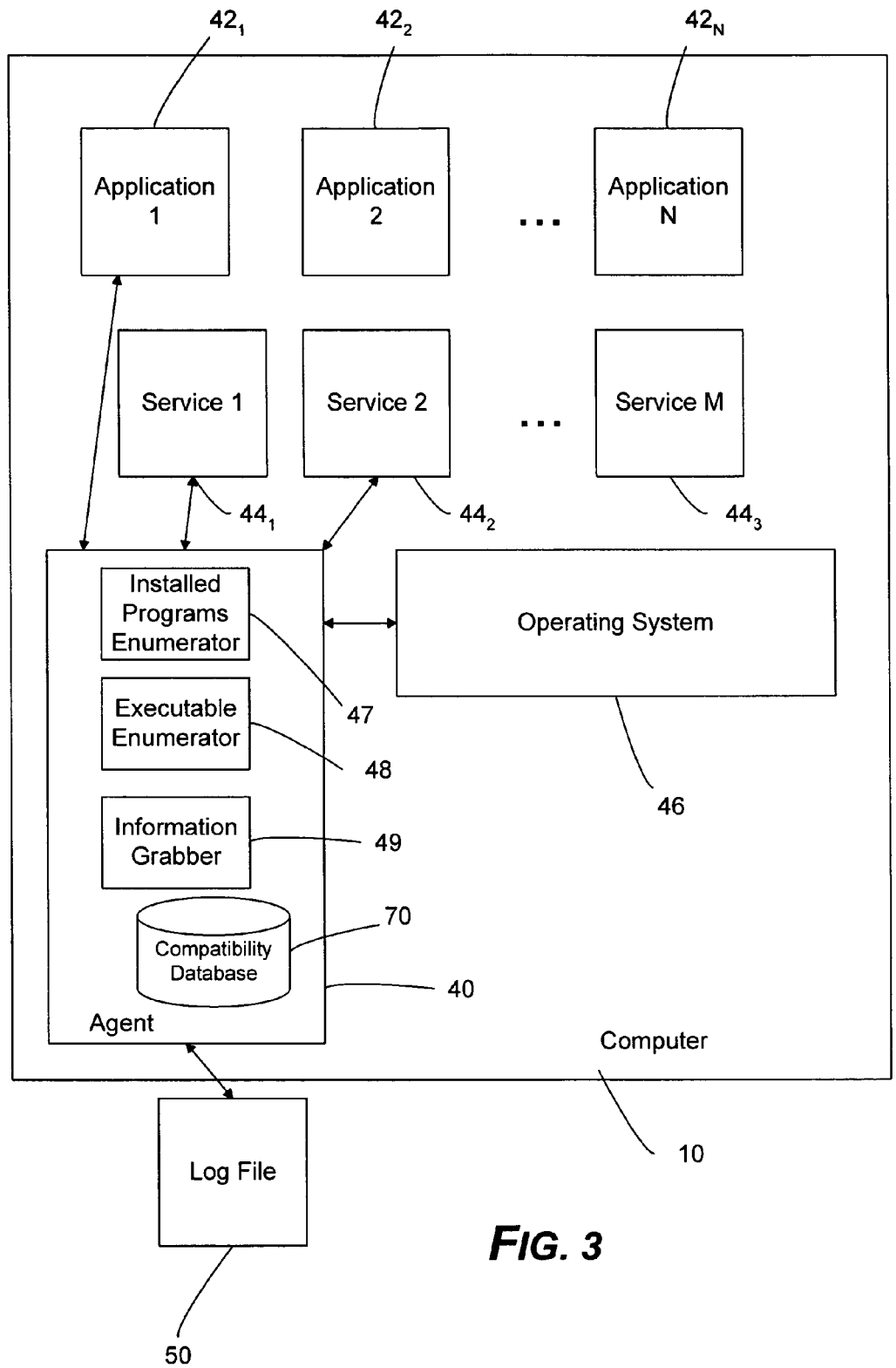
FIG. 3 is a block diagram displaying a representation of an agent installed on the computer of FIG. 2 in accordance with an embodiment of the present invention.

Referring now to FIG. 3, in accordance with an embodiment of the invention, an agent 40 is provided that is capable of finding, and collecting information from, one or more applications $42_1, 42_2, \ldots 42_N$ and/or one or more services $44_1, 44_2, \ldots 44_M$ on a computer (e.g., the computer 10). To this end, the agent 40 interacts with an operating system 46 of the computer 10, the applications $42_1, 42_2, \ldots 42_N$ and/or one or more services $44_1, 44_2, \ldots 44_M$, and other components as needed, as further described below.

In accordance with an embodiment of the invention, the information regarding the applications $42_1, 42_2, \ldots 42_N$ and/or the services $44_1, 44_2, \ldots 44_M$ is extracted and placed in a log file 50, which may, for example, be an extensible markup language (XML) file. One or more of these log files 50 may be then forwarded to a database 51 (FIG. 1) or several databases, which may, for example, be accessed by the network administrator computer 12, or by one or more other computers 10 on the network that may have an interest in accessing the information in the log file 50. The information in the log file may also be utilized by the computer 10 upon which the agent 40 is collecting information.

In accordance with one embodiment, the agent 40 is a tool or executable that may be loaded onto a single computer 10 so as to extract a log file 50 from that single computer, or may be distributed to a number of computers 10 so that a corresponding log file 50 may be provided for each of the computers 10. The agent 40 may be, as examples, distributed through a logon script, by running from a floppy disk, a website, a parent application, a network share, or may be run in conjunction with a software management system.

To aid in finding, and collecting information from, the applications $42_1, 42_2, \ldots 42_N$ and/or the services $44_1, 44_2, \ldots 44_M$, the agent 40 includes an installed programs enumeration component 47, an executable enumeration component 48, and an information grabber component 49. The function of each of these components is described below.

Figure 4:
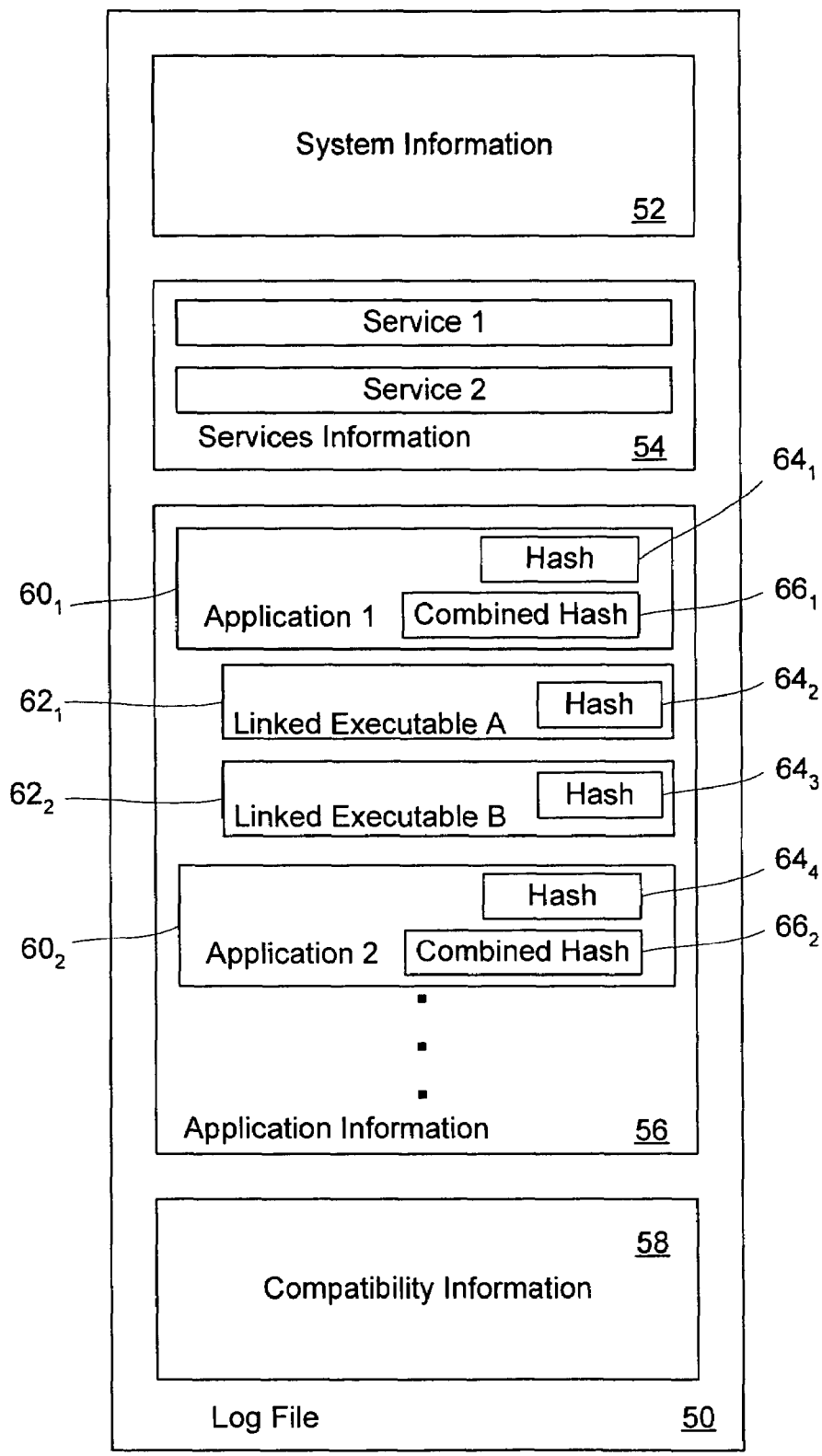
FIG. 4 is a block representation of an example of a log file in accordance with an embodiment of the invention.

A block representation of an example of a log file 50 in accordance with an embodiment of the invention is shown in FIG. 4. The log file 50 in the example includes system information 52, services information 54, applications information 56, and compatibility information 58. Each of these items is further described below, but some description is given here for the benefit of the reader.

The system information 52 is generally information that is specific to the computer 10 upon which the agent 40 is running its operation and may include, for example, operating system information, hardware information, drive information, processor information, and the like. In addition, the system information 52 may include information such as whether the computer is a particular type of server, such as a web server or email server, or network information, such as a department, the domain of the computer, an IP address of the computer, or a machine name for the computer. Additional system information 52 may include such items as an asset tag, a serial number, a vender for the computer, or other information.

The services information 54 generally includes a list of services on the computer 10, and information about services that are running on the computer. The information may include such information as the name, display name, and type of service, for example.

The application information 56 in accordance with an embodiment of the invention includes a list of the applications 42 on the computer 10, and information about each of the applications 42, such as version information, name information, folder or location information, checksum, company name, description, linker version, link date, copyright information, and so forth. In addition, information about each of the executables that are linked to each application 42 is preferably included in the application information 56.

The compatibility information 58 includes information about known compatibility issues. The known compatibility issues may include, for example, application help information for particular applications 42 having known issues of incompatibility, information about patches available for applications, or other information that may be useful for an application to run in particular environments.

In accordance with an embodiment of the invention, the log file 50 is maintained as an XML file. The hierarchical structure of XML, and its ease of use via tags, permits the log file 50 to be easily compressed, stored, transformed, displayed, assembled, accessed, and searched. However, if desired, another format, such as a relational table or a text file, may be used to store the log file. However, for ease of description, the log file 50 is described herein as being formed in XML.

An example of a log file 50 is shown in FIG. 4. The log file 50 shown in FIG. 4 is a simplified, high level representation of the schema of a log file in accordance with an embodiment of the invention. In the schema at FIG. 4, containers are defined for the system information 52, the services information 54, the application information 56, and compatibility information 58. Each of these containers includes various attribute sub-containers that may be used to store information retrieved by the agent 40. In accordance with an embodiment of the invention, switches or flags may be set on the agent 40 so that particular attributes of the schema may be selected for retrieval by the agent 40 in a collection process. For example, a collection process may define that all system information 52 for a computer may be retrieved, and that only particular attributes of applications 42 be retrieved.

In accordance with an embodiment of the invention, as further described below, the agent 40 enumerates items on the computer to find installed programs (e.g., services and applications). In the process of doing so and/or at a later time, the agent 40 retrieves information about the installed programs that are on the computer 10. In addition, associated executables of the installed programs are determined, and information about those associated executables is retrieved. Associated executables may be found, for example, by walking an import table for an executable.

In accordance with an embodiment of the invention, as further described below, to find installed programs on the computer 10, the agent 40 utilizes places, tools, or devices that a user utilizes to access an application. For example, if the Windows® Operating System is the operating system 46 of the computer 10, the agent 40 may utilize folders associated with Add/Remove Programs, the Start menu, and similar tools provided by the operating system or otherwise available on the computer to search for installed programs. As other examples, the user may use folders associated with links in the shell, the program menu, executables or links on the desktop, or items that have been indicated in the registry as RunOnce or Run. These folders may be accessed programmatically, for example.

As described below, after the agent 40 has searched for executables and installed programs, the agent 40 searches the folder in which the executable was found to find other executable programs that may be associated with (i.e., statically linked to) the installed program. To do so, the agent determines if the item is a file is defined by the agent 40 to be an executable. This definition may be made by switches available on the agent, and may be defined by file type, extension, or another suitable method. As an example, the files may be the types having an extension of DLL, ICD, DAT, ICO, BIN, or SYS. If a file is determined to be associated with an installed program, the agent then establishes within the log file 50 a hierarchical list having a number of application and services containers, each of which includes the installed program and the associated files. Associated executables may also be found via walking an import table for an executable.

Figure 5:
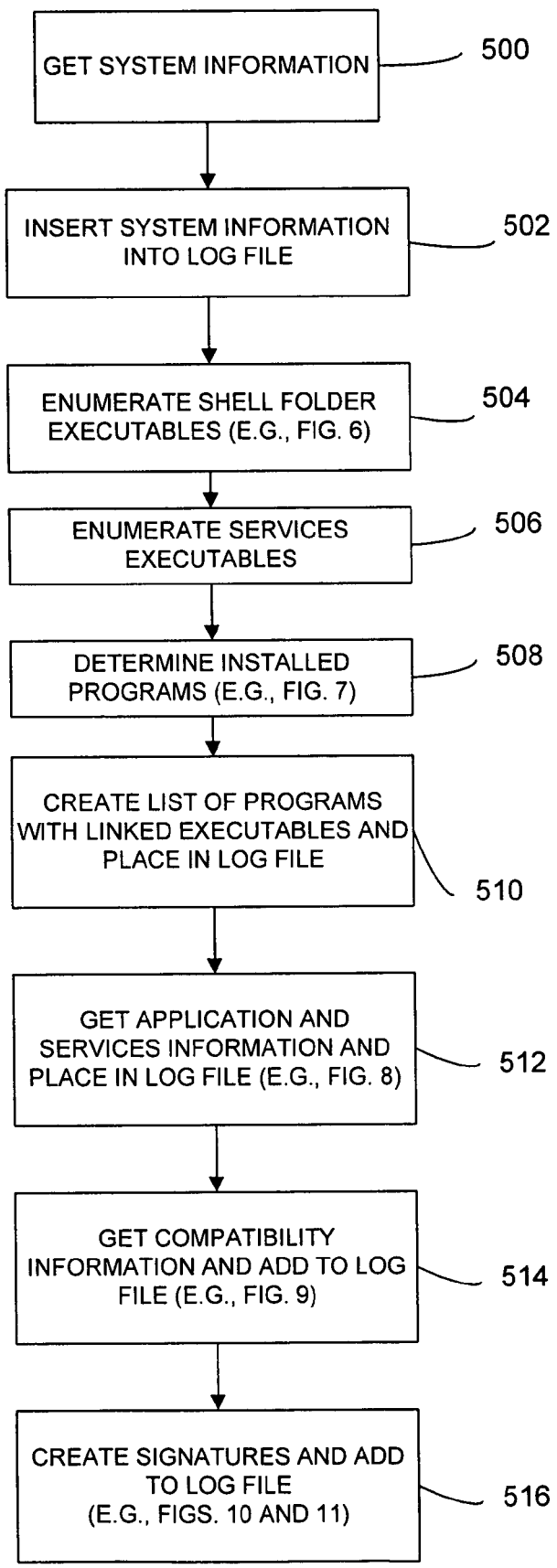
FIG. 5 is a flow chart generally showing steps for a collection process performed by the agent of FIG. 3 in accordance with an embodiment of the invention.

FIG. 5 is a flow chart generally showing steps for the collection process performed by the agent 40 in accordance with an embodiment of the invention. Beginning at step 500, the application gets system information 52. This system information 52, as described above, includes particular information about the computer 10 upon which information is collected by the agent 40. The agent 40 may extract the system information 52, for example by calling application programming interfaces (APIs) that are provided on the operating system 46 for the computer 10, via registry or similar information stored with the operating system, via hardware description that is stored in association with the operating system, or may be extracted via assembly code that may be written and included with the agent 40. A programmer of ordinary skill with knowledge of an operating system 46 for and/or structure of a computer may utilize features of the operating system and information stored with the operating system to write code or otherwise provide access to the system information 52. Once the system information 52 is extracted, it is inserted into the log file 50 at step 502.

At step 504, the agent 40, for example via the executable enumerator component 48, enumerates the executables within the defined set of shell folders on the computer 10. As an example, for a Windows® Operating System, these folders may be associated with "Common Desktop," "Desktop," "Common Start Menu," "Start Menu," "Common Programs," "Programs," or similar tools through which a user typically accesses an installed program or application. The executables may be found by looking for a defined file type or extension, such as EXE.

In accordance with an embodiment of the invention, operating system components are not added to the list of items to be added to the log file 50, because the agent 40 preferably extracts executables other than those that are operating system components. By not gathering information on executables that are designated as system components, most of these operating system items will be missed. In addition, if desired, items designated as protected or otherwise associated with the operating system will be skipped.

In any event, an example of a process that may be used for enumerating executables in the shell folders is described with FIG. 6 below. At step 506, service executables are enumerated, for example, for the Windows® Operating System, the services may be enumerated using the SCM APIs and a list of service executables may be generated. Some, none, or all of these may have previously been added to the list via step 504.

At step 506, the agent 40 determines the installed programs on the computer 10. Some or all of these installed programs may be the same as the executables found in step 504. In accordance with an embodiment of the invention, the determination of installed programs may be made via services or features on the computer 10 that provide lists or other information about installed programs. As an example, if the Windows® Operating System is used, then each of the applications 42 may include a Microsoft installer (MSI) component for each application 42 that includes information about the applications 42. A Microsoft installer product includes APIs which the agent 40 may access to determine whether the applications having the Microsoft installer feature are to be added to the list. An example of a method for determining the installed programs using MSI components is described together with FIG. 7, below.

As another example, the Add/Remove Program list may be used to find installed programs on the computer 10. If this feature is used, the uninstall registry path of each installed program may be used to figure out which installed programs are installed and those installed programs may be added to the installed program list.

At step 510, a list of installed programs (i.e., applications) is created with linked executables (i.e., associated files). The linked executables may be found, for example, by via walking an import table for the executables for the installed programs. This list of installed programs and linked executables is entered into the log file 50.

At step 512, the agent 40, for example via the information grabber 49, gets the information regarding the applications and services on the computer 10, including information about the associated executables. This information is also added to the log file 50. An example of a method for getting the information is described together with FIG. 8 below.

At step 514, the agent 40 gets the compatibility information 58, for example also via the information grabber 49. An example of the process that may be used to get the compatibility information is described together with FIG. 9.

At step 516, the agent 40 creates signatures for the executables in the log file 50. An example of how the signatures may be created is described together with FIGS. 10 and 11.

Figure 6:
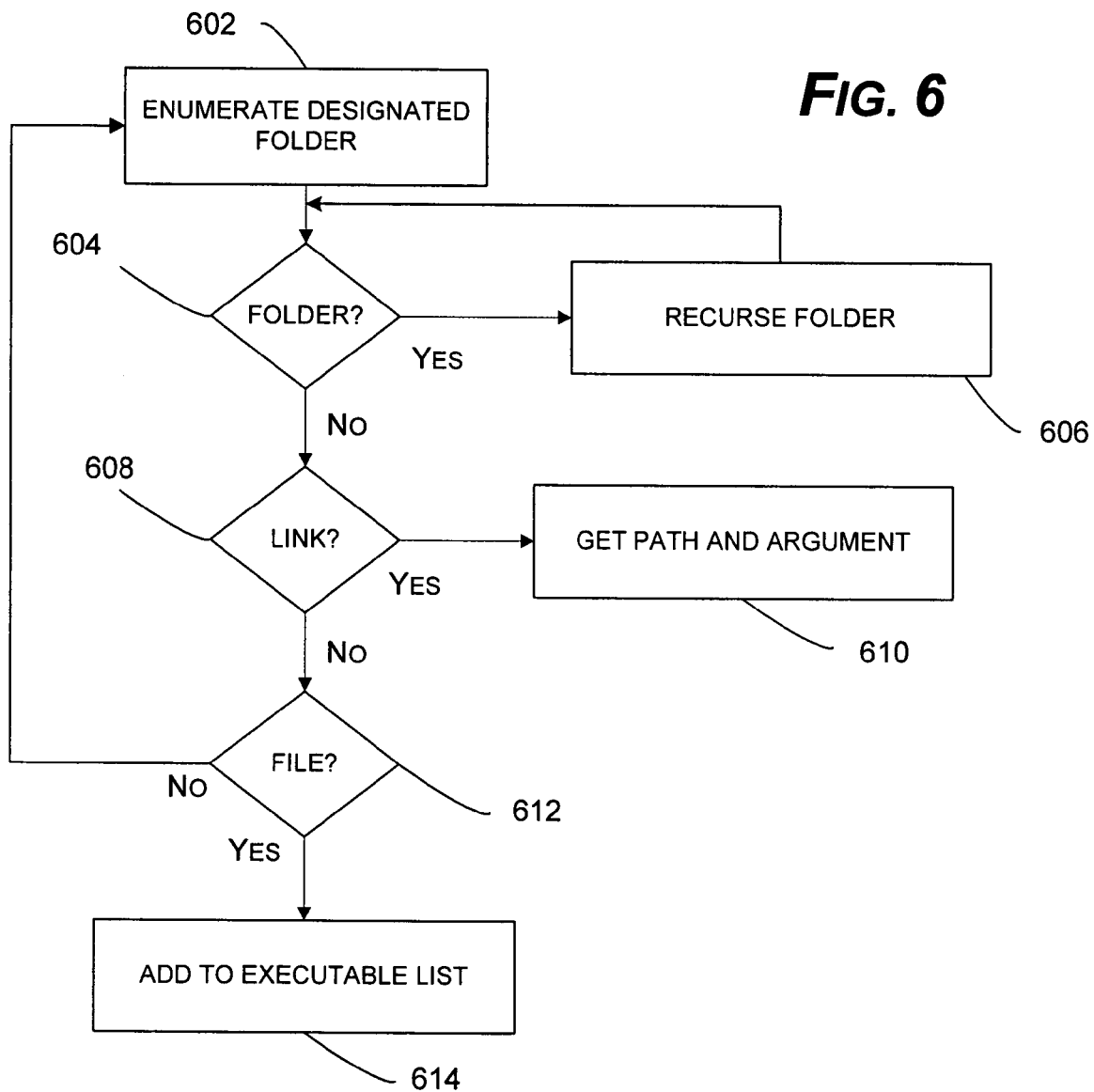
FIG. 6 is a flow diagram generally representing steps that may be used by the agent of FIG. 3 to enumerate executables in accordance with an embodiment of the invention.

FIG. 6 is a flow diagram generally representing steps that may be used by the agent 40 to enumerate shell folder executables on the computer 10 in accordance with an embodiment of the invention. In the embodiment shown, the agent 40 enumerates the designated folders of the computer 10 to find executables on the computer. Another system may be used to find the executables, depending upon the storage method used for the computer.

In any event, for the example shown in FIG. 6, at step 602, the enumeration of the shell folders begins. At step 604, a determination is made whether a first item checked within the folders is a folder. If it is, then the folder is recursed at step 606, and the process returns to step 604. If the item is not a folder, then the process branches from step 604 to step 608, where a determination is made if the item is a link. If so, then the path and argument for the link are extracted in step 610, and any folders or items found may be used in the enumeration process. As such, the process returns to step 604, using the path and argument as the next item. If the item is not a link, the process branches from step 608 to step 612, where a determination is made if the item is a file that is defined by the agent 40 to be an installed program. This definition may be made by file type, extension, or another suitable method.

If the item meets the definition of executable, then the item is added to the list in step 614. If not, then the agent 40 enumerates the next item at step 616, and the process branches back to step 604. The process continues until all items within the shell folder have been enumerated, resulting in a list of files defined by the agent 40 as being executables.

Figure 7:
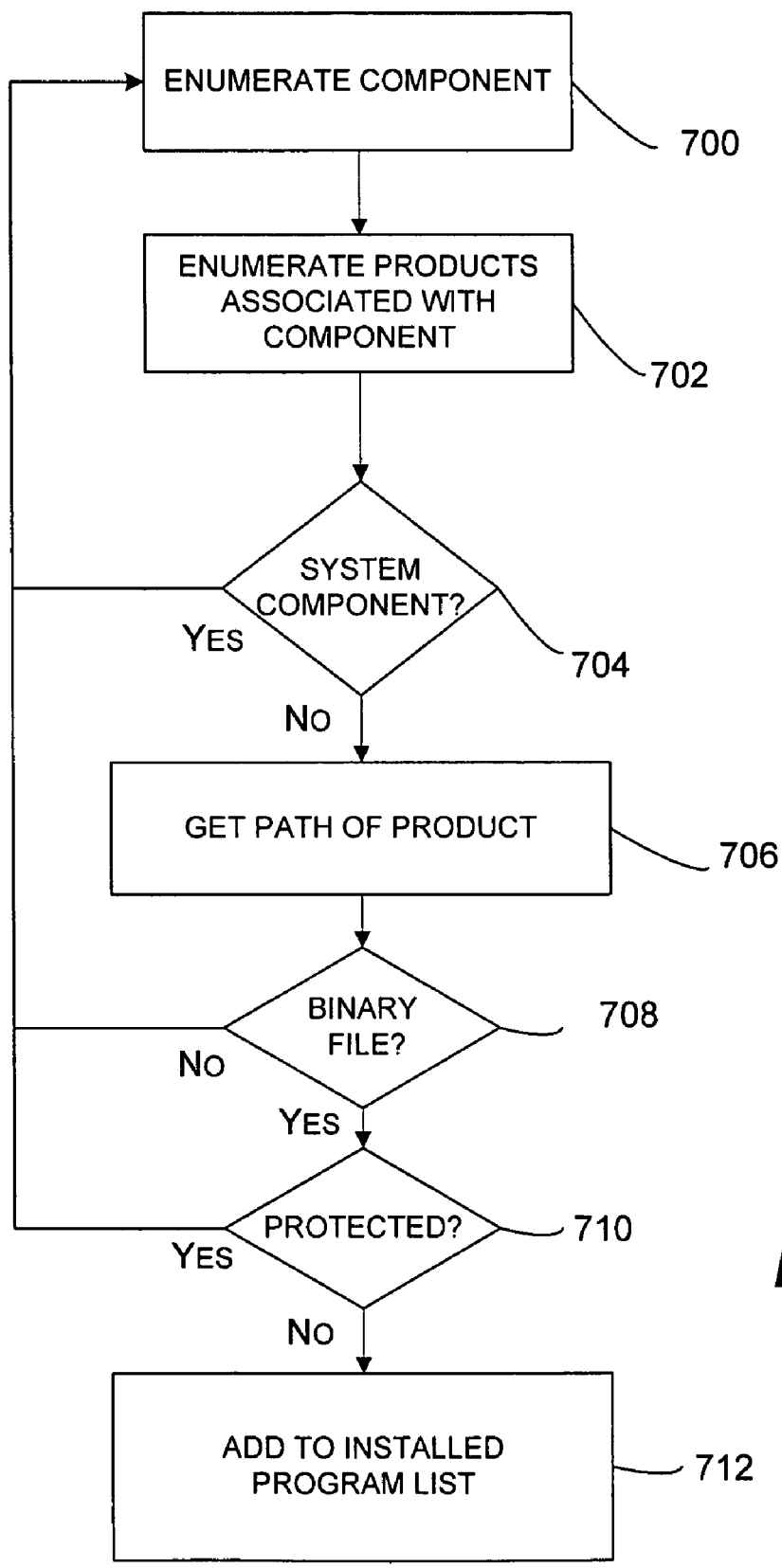
FIG. 7 is a flow chart generally showing steps for determining whether an executable should be added to installed programs list in accordance with an embodiment of the present invention.

FIG. 7 is a flow chart generally showing steps for determining whether an application should be added to the list using information in Microsoft installer (MSI). MSI provides an API that permits access to this information. Beginning at step 700, each Microsoft installer item is enumerated. At step 702, the products associated with the component are enumerated. At step 704, a determination is made whether the product is a system component, i.e., part of the operating system. If an item is a system component, i.e., associated with the operating system 46, the item is skipped, as described above, and the process loops back to step 700 where the next component is enumerated. Alternatively, the process may loop back to step 702 if all products of the component have not yet been enumerated.

If the item is not a system component, the process branches to step 706, where the agent 40 gets the path of the product. At step 708, a determination is made whether the product is a binary file. If not, the process branches back to step 700. If so, then the process branches to step 710, where a determination is made whether the file is protected. If so, then the process branches back to step 700. If not, then step 710 branches to step 712, where the product is added to the installed program list.

Further enumeration may be done, such as, for example, via the Add/Remove programs, Run or Runonce, as described above. After enumeration is done, a list results, the list having installed programs and executables. The import tables for the installed programs may be walked, providing associated executables and mapping information to the corresponding installed program. The agent 40 may proceed with extracting information about the programs and the executables, as shown in FIG. 8, below.

In accordance with an embodiment of the invention, information that is extracted regarding an executable may be obtained from one or many sources. If many sources are available, then the agent 40 chooses the best source for extracting information regarding the executable. In accordance with an embodiment of the invention, the best source is the source which has the most reliable and/or has available the most information about an application. As an example, the information stored with a MSI component is typically more reliable and more detailed than information that may otherwise be stored with an application. Thus, the agent 40 utilizes a better source for information that it extracts and puts into the log file 50. However, if desired, the agent 40 may also store information about the fact that the executable is found by more than one source, such as being found via a search of the folders listed above and via an enumeration of the MSI components.

The act of extracting information may be conducted after all the executables have been enumerated, or information about the executables may be extracted when the executables are enumerated. However, for ease of description, the information extraction feature of the agent 40 is described separately in this document.

Figure 8:
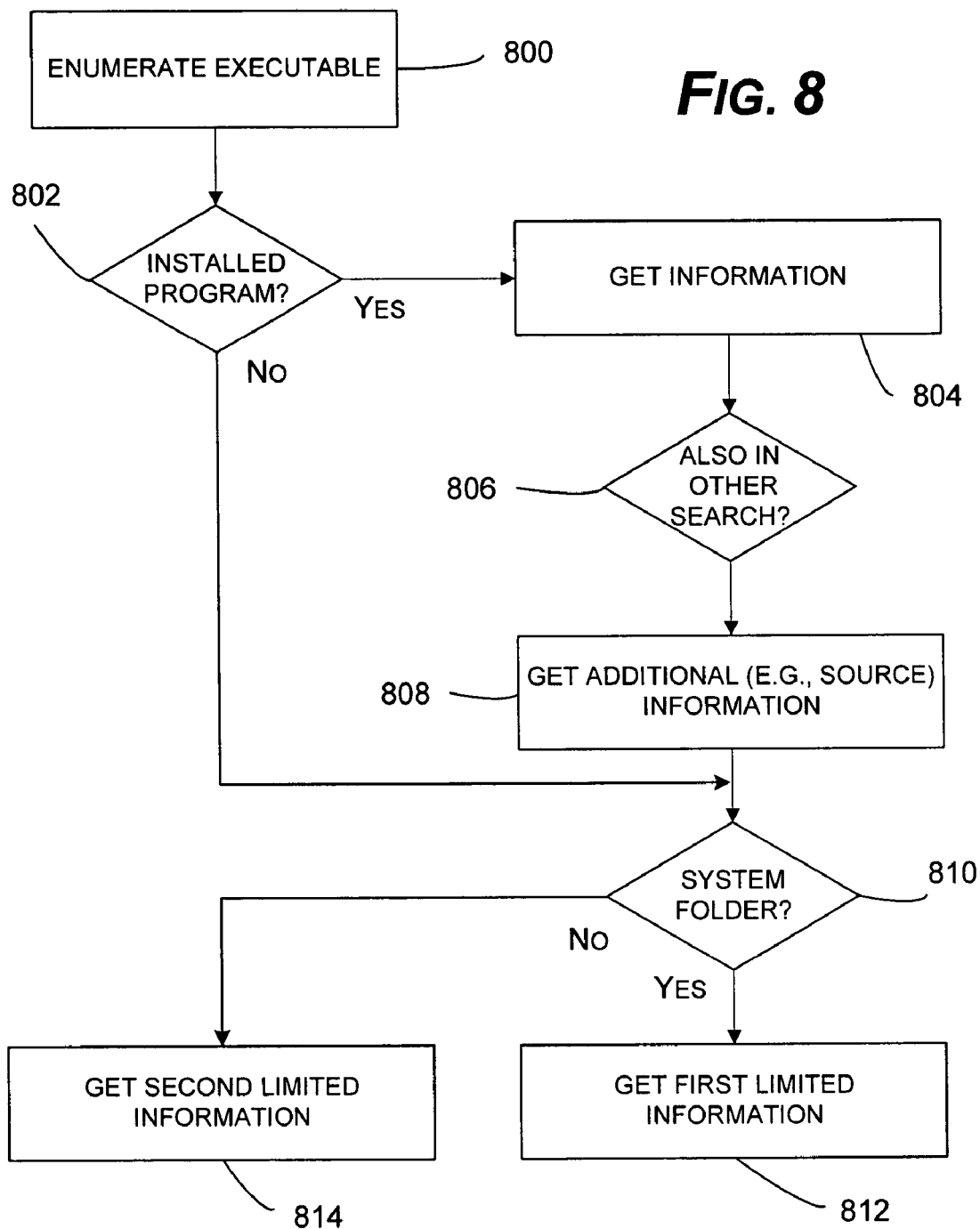
FIG. 8 is a flow diagram generally representing steps for gathering information about an executable in accordance with an embodiment of the invention.

FIG. 8 is a flow diagram generally representing steps for extracting information from an executable in accordance with an embodiment of the invention. Beginning at step 800, the executable is enumerated. At step 802, a determination is made if the executable is an installed program, i.e., whether the executable is in the installed program list as described above. If so, step 802 branches to step 804 where the information for the installed program is retrieved in accordance with the filters set for the agent 40. The process then proceeds to step 806, where a determination is made whether the executable also found in another search, e.g., was found in two searches, with the other search not providing as reliable of information. If so, then limited information is retrieved in step 808, such as only the source information for the file, that is, the fact that the file was also found in the other search. This similar source information may also have been added in step 804, where the source information, such as Add/Remove Program, may be added to the information.

The process then proceeds to step 810, where a determination is made whether the item is in the system folder. If so, then process branches to step 812 where first limited information is retrieved, which may be defined by different filters set for the agent 40. This first limited information may be, for example, the checksum for the executable. If not, then step 810 branches to step 814 where still other, second limited information may be retrieved, which may also be set by the filters. This second limited information may be, for example, product name, source, and vendor. If the executable is not an installed program, then step 802 skips directly to step 810, where the process proceeds as described above.

The process of FIG. 8 results in the log file 50 shown in FIG. 4. The log file 50 includes the system information 52 described above, the service information 54, also described above, and a number of applications 42 in application containers $60_1$, $60_2$, . . . Each of the application containers may include associated therewith a number of associated executables 62. Similarly, the services information 54 may include a list of installed programs 63, and may additionally include associated executables (not shown).

As described above, the agent 40 may also insert compatibility information 58 into the log file 50. To this end, a database 70 (FIG. 3) of compatibility information may be included with the agent 40 for the agent 40 to extract this information. Alternatively, a similar database may be included with the operating system 46, may otherwise be stored locally on the computer 10, or a similar database may be available remotely, e.g., via the network 11.

Each of the executables found in the processes described above are checked against the compatibility database 70, or databases, to determine whether compatibility information is available for the executable. As described above, this compatibility database 70 may include information such as whether there is application help information or fixes or known compatibility problems for the application 42. In addition, the information regarding the application 42 may then be stored in the compatibility information 58 (FIG. 4). The process of finding the compatibility information 58 may be done via a separate thread, and may be completed at the same time or before or shortly after that enumeration of each of the executables is completed.

Figure 9:
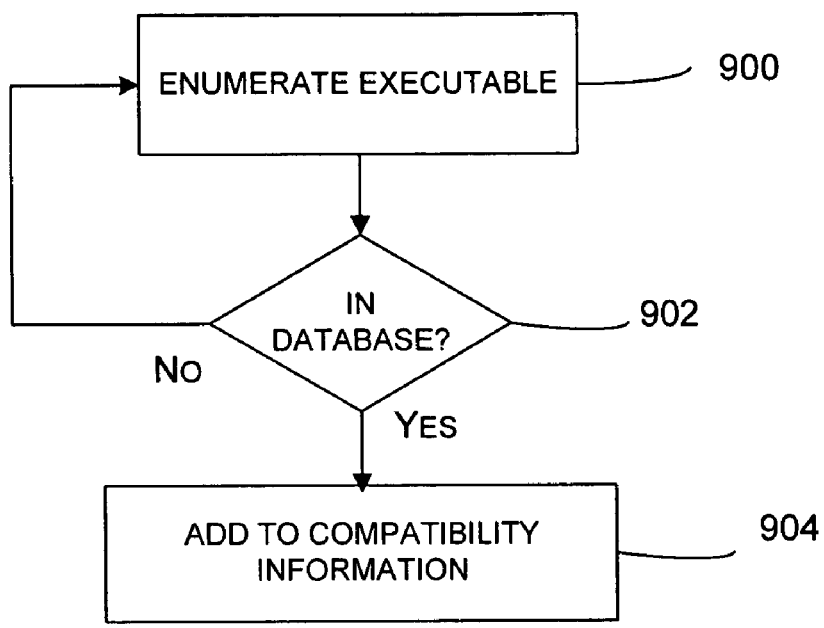
FIG. 9 is a flow diagram generally representing steps for gathering information about compatibility in accordance with an embodiment of the invention.

FIG. 9 shows a flow chart generally representing steps for adding compatibility information 58 to the log file 50 in accordance with an embodiment of the invention.

Beginning at step 900, the executables in the list are enumerated. At step 902, a determination is made whether the executable is in the compatibility database 70. If so, step 902 branches to step 904 where the information in the database 70 is added to the compatibility information 58 and the log file 50. If not, step 902 branches back to step 900, where the next executable is enumerated.

As described above, the information for each of the executables in the service information 54 or the application information 56 may include a number of different attributes for each of the executables. In accordance with an embodiment of the invention, a subset (i.e., some or all) of these attributes may be utilized to form a signature or hash for the executable. As an example, one signature for an executable may utilize the following subset of attributes:
NAME (string)
BIN_FILE_VERSION (qword)
BIN_PRODUCT_VERSION (qword)
PRODUCT_VERSION (string)
FILE_DESCRIPTION (string)
COMPANY_NAME (string)
PRODUCT_NAME (string)
FILE_VERSION (string)
ORIGINAL_FILENAME (string)
INTERNAL_NAME (string)
LEGAL_COPYRIGHT (string)
MODULE_TYPE (dword)
16BIT_DESCRIPTION (string)
16BIT_MODULE_NAME (string)
VER_LANGUAGE (dword)

These attributes represent, for example, a version signature for an executable. An operation may be performed on these particular attributes so as to form the signature or hash, resulting in a number representing the attributes of the executable. In accordance with an embodiment of the invention, a cyclic redundancy check (CRC), such as a CRC 32, is one type of algorithm that may be applied to the information to generate the signature or hash. As is known, a cyclic redundancy check is a number derived from a block of data, usually used in order to detect corruption or occlusion of all the data. To calculate the CRC, all the attributes that can be found for an executable are copied byte-wise into a buffer, leaving off the NULL character at the end of strings. A CRC32 is then calculated for the entire buffer.

If desired, a second signature file or even additional signature files may be stored with the information for a service executable or an application executable. As another example of attributes that may be used in the second attribute file, the following attributes may be used:
SIZE (dword)
CHECKSUM (dword)
PE_CHECKSUM (dword)
LINKER_VERSION (dword)
LINK_DATE (dword)

The above attributes result in a more specific hash for an executable. This signature may be used, for example to determine exact matches to a known version of an executable.

One or both of the signature files above may be utilized by a person accessing the log file 50 to quickly determine whether the application 42 matches a known attribute set of an executable. In accordance with an embodiment of the invention, the combined attributes as defined in one of the sets above or in another attribute set for all executables associated with one installed program may have a number derived from them, resulting in a combined signature or hash. This combined signature or hash may also be used to determine whether a completed installed matches known characteristics of an application 42 or a service. This information may be used, for example, to determine the exact version of an application 42, whether known fixes have been installed for executables associated with the application 42, or for other purposes. The signature may be stored along with the information for the executable, as is shown by the reference numeral 64 in FIG. 9. The combined signatures may also be stored with the application 42, or may be stored in a separate location, such as a local or remote database, as convenient.

Figure 10:
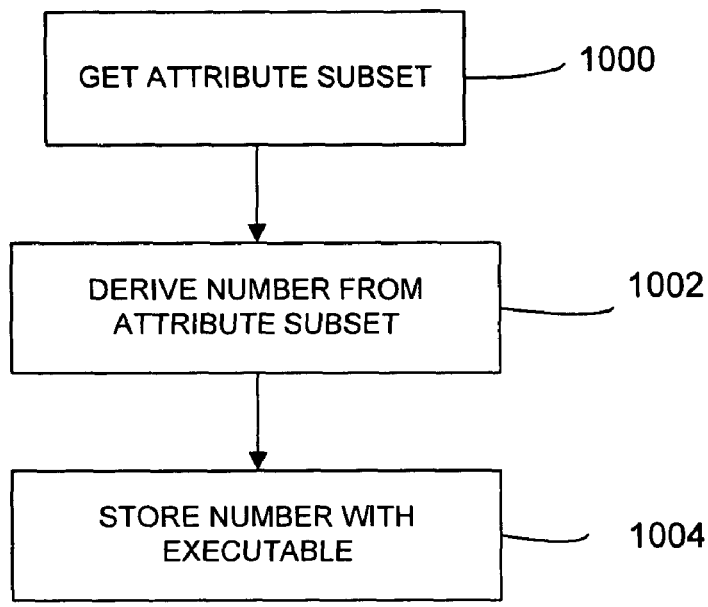
FIG. 10 shows a flow diagram generally representing steps for generating a signature for an executable in accordance with an embodiment of the invention.

FIG. 10 shows a flow diagram generally representing steps for generating a signature for an executable in accordance with an embodiment of the invention. Beginning at step 1000, the attributes for the executable are retrieved. At step 1002, the algorithm is performed on the attributes, and at step 1004, the signature that is a result of the algorithm is stored with the executable.

Figure 11:
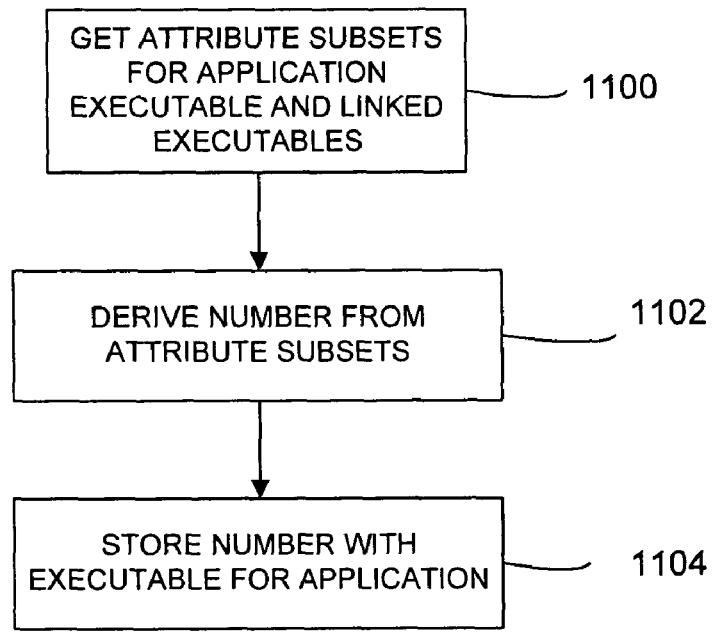
FIG. 11 shows a flow diagram generally representing steps for producing a combined signature file in accordance with an embodiment of the invention.

FIG. 11 shows a flow diagram generally representing steps for producing a combined signature file in accordance with an embodiment of the invention. Beginning at step 1100, the attributes for all executables associated with the application 42 are retrieved. At step 1102, the algorithm is performed on the attributes and at step 1104 the signature is stored with the application file information for the application 42.

Utilizing the agent 40 of the present invention, a user or an administrator may generate the log file 50, which permits the user to have readily available information regarding the application 42, including the signature file. A number of the log files 50 may be accumulated, for example in the database 51, and may be searched, accessed, or otherwise utilized by an administrator or a user that needs to know information about the applications 42 on the computer 10. The log file 50 thus provides a convenient vehicle for storing information about applications 42 on a computer 10. If desired, the agent 40 may be run on an interval, or at startup, or at other desired times defined or requested by an administrator or a user. As such, the log file 50 may remain current so that the information in the log file 50 represents the actual information on the computer 10.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method of collecting and storing information about the programs installed on and the services provided by a computer for subsequent retrieval, comprising:
    (a) extracting from the computer information including, but not limited to, information about the computer operating system, hardware, and processor and storing the system information in a log file in a standardized language;
    (b) extracting from the computer executables information including, but not limited to, information about executables included in a defined set of folders stored on the computer and executables associated with services provided by the computer;
    (c) for each executable whose information is extracted, determining if the executable is associated with the operating system, and if it is determined that the executable is not associated with the operating system, storing information about the executable in the log file, the stored executable information including attributes determined by the executables, each executable including a plurality of associated attributes, the attributes including at least one attribute, other than a version number, in the standardized language;
    (d) extracting from the computer information regarding the application programs installed on the computer including linked executables and storing the application program information in the log file in a standardized language, the application program information including attributes determined by the application programs including the linked executables; and
    (e) deriving a signature for each of the executables, the signature being based on more than one of the plurality of attributes associated with the related executable and storing the resultant signatures in the log file in the standardized language.

2. The method of claim 1, further comprising storing the signatures in an XML file associated with the executables.

3. The method claim 1, further comprising storing the information in an XML file associated with the executables.

4. The method of claim 3, further comprising storing the signature in the XML file.

5. The method of claim 1, wherein extracting the application program information comprises accessing an installer component of the computer.

6. The method of claim 5, wherein the application program information is stored in connection with the installer component.

7. The method of claim 1, wherein extracting the application program information comprises accessing more than one information source.

8. The method of claim 7, further comprising choosing a best source of the more than one information source and utilizing that best source to provide at least some of the application program information.

9. The method of claim 8, further comprising storing information about the sources other than the best source with the application program information.

10. The method of claim 1, wherein deriving a signature comprises generating a number from the subset utilizing a cyclic redundancy check.

11. A computer-implemented method of collecting and storing information about the applications installed on and the services provided by a computer for subsequent retrieval, comprising:
(a) extracting from the computer executables information;
(b) for each executable, determining if the executable is associated with a computer operating system; and
(c) for each executable not associated with the operating system:
   (i) enumerating each executable associated with each application of a plurality of applications installed on the computer and each service of a plurality of services provided by the computer that has an associated executable;
   (ii) extracting information about the executable, the information including a plurality of attributes associated with the executable, the attributes including at least one attribute other than a version number, and storing the information in a log file in a standardized language; and
   (iii) deriving a signature from a combined set of attributes, the combined set of attributes including at least two of the attributes associated with the related executable and storing the signature in the log file in a standardized language.

12. The method of claim 11, wherein the log file in which the signature is stored is an XML file associated with the application or service.

13. The method of claim 11, wherein the log file in which the information is stored is an XML file associated with the application or service.

14. The method of claim 13, further comprising storing the signature in the XML file.

15. The method of claim 11, wherein extracting the information that is stored in the log file comprises accessing an installer component of the computer.

16. The method of claim 15, wherein the information is stored in connection with the installer component.

17. The method of claim 11, wherein extracting the information that is stored in the log file comprises accessing more than one source for the information.

18. The method of claim 17, further comprising choosing a best source of the more than one source for the information, and utilizing that best source to provide at least some of the information that is stored in the log file.

19. The method of claim 18, further comprising storing information in the log file about the sources other than the best source with the information.

20. The method of claim 11, wherein deriving a signature that is stored in the log file comprises generating a number from the combined set utilizing a cyclic redundancy check.

21. A computer-readable storage medium having computer executable components for collecting information about one or more applications on a computer, comprising:
a selection component configured to select the most reliable source for obtaining information regarding attributes about an application on the computer and cause the collection component to retrieve the particular attributes from the most reliable source;
a collection component operable to:
   extract from the computer information including the computer operating system, hardware, and processor and storing the system information in a log file in a standardized language;
   for each executable on the computer, determining if the executable is associated with the operating system;
   if the executable is not associated with the operating system, the collection component is further configured to generate a signature based on a set of attributes that are unique to the executable obtained from the source identified by the selection component;
   wherein to generate a signature based on a set of attributes that are unique to the executable includes enumerating through a plurality of files to identify each executable that is linked to the application; and
a compatibility component configured to compare signatures of each executable obtained by the collection component to a compatibility database and determine whether an incompatibility exists between two or more applications installed on the computer based on the result of the signature comparison.

22. The computer-readable storage medium as recited in claim 21, wherein to generate a signature based on a set of attributes that are unique to the executable from the source identified by the selection component includes providing a standard XML reporting schema to represent attributes of an application in a hierarchical manner and wherein to determine whether an incompatibility exists between two or more applications installed on the computer includes serializing and deserializing information obtained by the collection component between XML and a non-hierarchical data format.

* * * * *